United States Patent
Wu et al.

(10) Patent No.: US 6,567,765 B1
(45) Date of Patent: May 20, 2003

(54) EVALUATION SYSTEM AND METHOD FOR FINGERPRINT VERIFICATION

(75) Inventors: Zhenyu Wu, Plainsboro, NJ (US); Jianzhong Qian, Princeton, NJ (US); Manfred Bromba, Munich (DE)

(73) Assignee: Siemens Corporate Research, Inc., Princeton, NJ (US)

(*) Notice: Subject to any disclaimer, the term of this patent is extended or adjusted under 35 U.S.C. 154(b) by 325 days.

(21) Appl. No.: 09/641,180

(22) Filed: Aug. 17, 2000

(51) Int. Cl.[7] .................................................. G06K 9/00
(52) U.S. Cl. ........................... 702/182; 702/19; 702/32; 702/108; 702/124; 702/179
(58) Field of Search ............................ 702/19, 108, 32, 702/124, 179, 181, 183, 188, 189, FOR 115, FOR 131, FOR 134, FOR 139, FOR 170–FOR 171; 340/5.52, 5.53; 382/115, 124, 125, 126, 127; 703/2

(56) References Cited

U.S. PATENT DOCUMENTS

| | | | | |
|---|---|---|---|---|
| 5,613,014 A | * | 3/1997 | Eshera et al. | 382/124 |
| 5,659,626 A | * | 8/1997 | Ort et al. | 382/125 |
| 5,845,005 A | * | 12/1998 | Setlak et al. | 382/124 |
| 5,909,501 A | * | 6/1999 | Thebaud | 382/124 |
| 6,067,369 A | * | 5/2000 | Kamei | 382/125 |
| 6,072,895 A | * | 6/2000 | Bolle et al. | 382/125 |
| 6,105,010 A | * | 8/2000 | Musgrave | 705/44 |
| 6,185,316 B1 | * | 2/2001 | Buffam | 382/115 |
| 6,188,780 B1 | * | 2/2001 | Nakayama | 382/124 |
| 6,233,348 B1 | * | 5/2001 | Fujii et al. | 382/125 |
| 6,259,805 B1 | * | 7/2001 | Freedman et al. | 382/124 |
| 2001/0025342 A1 | * | 9/2001 | Uchida | 713/186 |
| 2002/0031245 A1 | * | 3/2002 | Rozenberg et al. | 382/125 |
| 2002/0040961 A1 | * | 4/2002 | Okamoto et al. | 250/208.1 |

FOREIGN PATENT DOCUMENTS

| | | | |
|---|---|---|---|
| JP | 55-138174 | * | 10/1980 |
| JP | 2000-163578 | * | 6/2000 |
| JP | 2001-216045 | * | 8/2001 |
| JP | 2001-325549 | * | 11/2001 |

* cited by examiner

Primary Examiner—Marc S. Hoff
Assistant Examiner—Carol S Tsai
(74) Attorney, Agent, or Firm—Donald B. Paschburg

(57) ABSTRACT

A system and method for evaluating a biometric detection system, in accordance with the present invention, provides an edited database including a plurality of existing biometric images with corrected extracted features that were acquired with a sensor or sensors different from the sensor of the system under evaluation. A second database, smaller than the edited database, is edited which includes biometric images (that were acquired by the sensor of the system under evaluation) are employed to evaluate the biometric detection system. The second database has errors in extracted features corrected. A statistical perturbation model is constructed to describe degradation characteristics of the extracted features from the second database as provided in the editing step. The statistical perturbation model is applied to the edited database to construct a perturbed database sensitive to degradations of the biometric system under evaluation. The biometric system is evaluated against the edited database and the perturbed database to predict a performance of the biometric system.

19 Claims, 3 Drawing Sheets

EVALUATION SYSTEM AND METHOD FOR FINGERPRINT VERIFICATION

BACKGROUND

1. Technical Field

This disclosure relates to finger print recognition, and more particularly, to a system and method for evaluating for fingerprint systems, which is capable of predicting performance with a high level of confidence without the need to acquire a large number of testing images.

2. Description of the Related Art

Fingerprint may be performed electronically to verify a person's identity for different applications, for example, entry into a secured area, access to a bank account, etc. Referring to FIG. 1, a fingerprint verification system 10 typically includes the following components. A sensor 12 is included that acquires fingerprint images, often at a resolution of about 500 pixels per inch (ppi). A feature extraction module 16 converts image pixels into a small set of characteristic features for concise image representation. The most commonly used features are the minutiae of the fingerprint; i.e. the ridge ending or bifurcation points. Other features include cores and deltas, ridge count between minutia pairs, and ridge width. Module 16 may also include a quality control sub-module 14, which can provide feedback to users on poorly acquired images or non-fingerprint images. A fingerprint matcher 18 assigns a similarity score between a search (candidate) print and a reference print from a database 20, and decides whether to declare a match between the pair. Normally the matcher relies entirely on the features provided by the feature extractor 16.

In block 30, components are provided for training system 10 to associate a given person to their fingerprint. Fingerprint data is stored in database 20 and employed by matcher 18 to later verify users stored in database 20. Matcher 18 is part of an authentication module 32.

In FIG. 1, the verification algorithm of the system 10 is divided into two modules: feature extractor 16 and matcher 18. This separation is important in the context of performance evaluation. It permits analysis of matcher performance in isolation from the more sensor-dependent feature extractor. The matcher is nearly sensor independent. In spite of their intimate inter-relationship, these two modules tend to be impacted differently by factors affecting the performance of a fingerprint system. For instance, image warping due to finger elasticity affects exclusively the matcher 18, while intensity shift caused by moisture in fingers affects mostly the feature extractor 16. Of course, errors made by the feature extractor 16 are propagated through the matcher 18 and their effects need to be analyzed as well.

Since fingerprint systems are subject to strong statistic errors and the complex biometric features used for matching generally cannot be accurately described by mathematical models, it is very important to expose the systems to rigorous tests to assess their performance during development. A common method for system evaluation and validation is to use large-scale field tests. While this approach is effective, it is very costly and time consuming. Alternatively, existing fingerprint databases may be used to evaluate the algorithm portion of the system, e.g., the feature extractor 16 and the matcher 18; however, the testing results are often skewed due to at least the reasons listed below:

1. The characteristics of the sensor from which the database was constructed are often different from the sensor in the system under evaluation. As a result, the performance of the feature extractor, usually tuned to a particular sensor for optimal performance, cannot be subjectively and realistically assessed.

2. Even if the feature extractor were tuned for images in the database, the performance of the matcher is still biased by characteristics of the statistical variability and distortion of images in the database. Performance degradation due to poorly extracted features often cannot be easily separated from inherent deficiencies of the matcher.

Another option for system performance evaluation is to use synthetic fingerprint images, for example, synthetic fingerprint images generated by OPTEL, LTD. software, e.g., Fingerprint Synthesis™. However, there exist severe limitations in the usefulness of synthetic fingerprint images. The most severe and also hardest to overcome is the extreme difficulty of generating synthetic images that can realistically mimic the characteristics of defects, artifacts and noise naturally present in real fingerprint images. As a result, the performance of a feature extractor in synthetic images tends to be a poor predictor for its performance in real images. In addition, the natural distribution of finger features is very complex and cannot be easily characterized by simple statistical models. For instance, random distribution of minutiae tends to produce optimistic estimates of FAR (false acceptance rate) and FRR (false rejection rate) distributions.

Therefore, a need exists for an evaluation technology for fingerprint systems, which is capable of predicting system performance with high confidence without the need to acquire a large number of testing images. A further need exists for a method for evaluating fingerprint systems which is accurate, quick and economical.

SUMMARY OF THE INVENTION

A system and method for evaluating a biometric detection system, in accordance with the present invention, provides an edited database including a plurality of existing biometric images with corrected extracted features that were acquired with a sensor or sensors different from the sensor of the system under evaluation. A second database, smaller than the edited database, is edited which includes biometric images (that were acquired by the sensor of the system under evaluation) are employed to evaluate the biometric detection system. The second database has errors in extracted features corrected. A statistical perturbation model is constructed to describe degradation characteristics of the extracted features from the second database as provided in the editing step. The statistical perturbation model is applied to the edited database to construct a perturbed database sensitive to degradations of the biometric system under evaluation. The biometric system is evaluated against the edited database and the perturbed database to predict a performance of the biometric system.

Another method, in accordance with the present invention, for evaluating a biometric detection system, includes the steps of providing a first database having a plurality of biometric images representative of a predetermined population, editing the first database to construct an edited database, the edited database having errors in extracted features from the first database corrected, providing a second database, smaller than the first database, which includes biometric images employed to evaluate the biometric detection system, the second database being representative of a sample of the predetermined population, editing the second database to construct an edited database having errors in extracted features from the second database corrected, constructing a statistical perturbation model to describe degradation characteristics of the extracted features from the second database, applying the statistical perturbation model to the first database to construct a perturbed database sensitive to degradations of the biometric detection system and evaluating the biometric detection system against the first database and the perturbed database to predict a performance of the biometric detection system.

In other systems and methods, the biometric detection system preferably includes a fingerprint recognition system, and the biometric images include images of fingerprints. The step of constructing a statistical perturbation model to describe degradation characteristics of the extracted features from the second database as provided in the editing step may include estimating a difference between an ideal feature extractor and a degraded feature extractor which provided the degradation characteristics. The step of providing an edited database including a plurality of biometric images with corrected extracted features may include the steps of extracting biometric features from a database representative of a user population using a feature extractor and correcting errors committed by the feature extractor. The step of editing a second database may include the steps of extracting biometric features from a database representative of a user population using a feature extractor and correcting errors committed by the feature extractor. The step of constructing a statistical perturbation model may include the step of recording differences in the degradation characteristics of the extracted features from the second database before and after the step of editing to summarize degradation introduced by a sensor and a feature extractor of the biometric detection system.

The methods of the present invention may be implemented on a program storage device(s) readable by machine, tangibly embodying a program of instructions executable by the machine to perform the method steps for evaluating a biometric detection system.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

The present invention provides a new technology for predicting the performance of fingerprint verification systems in large-scale field trials using only data collected from small-scale field trials and an existing large fingerprint database. The present invention is capable of producing realistic evaluation results that are highly correlated with outcomes from large-scale field trials at significantly lower cost.

Figure 2:
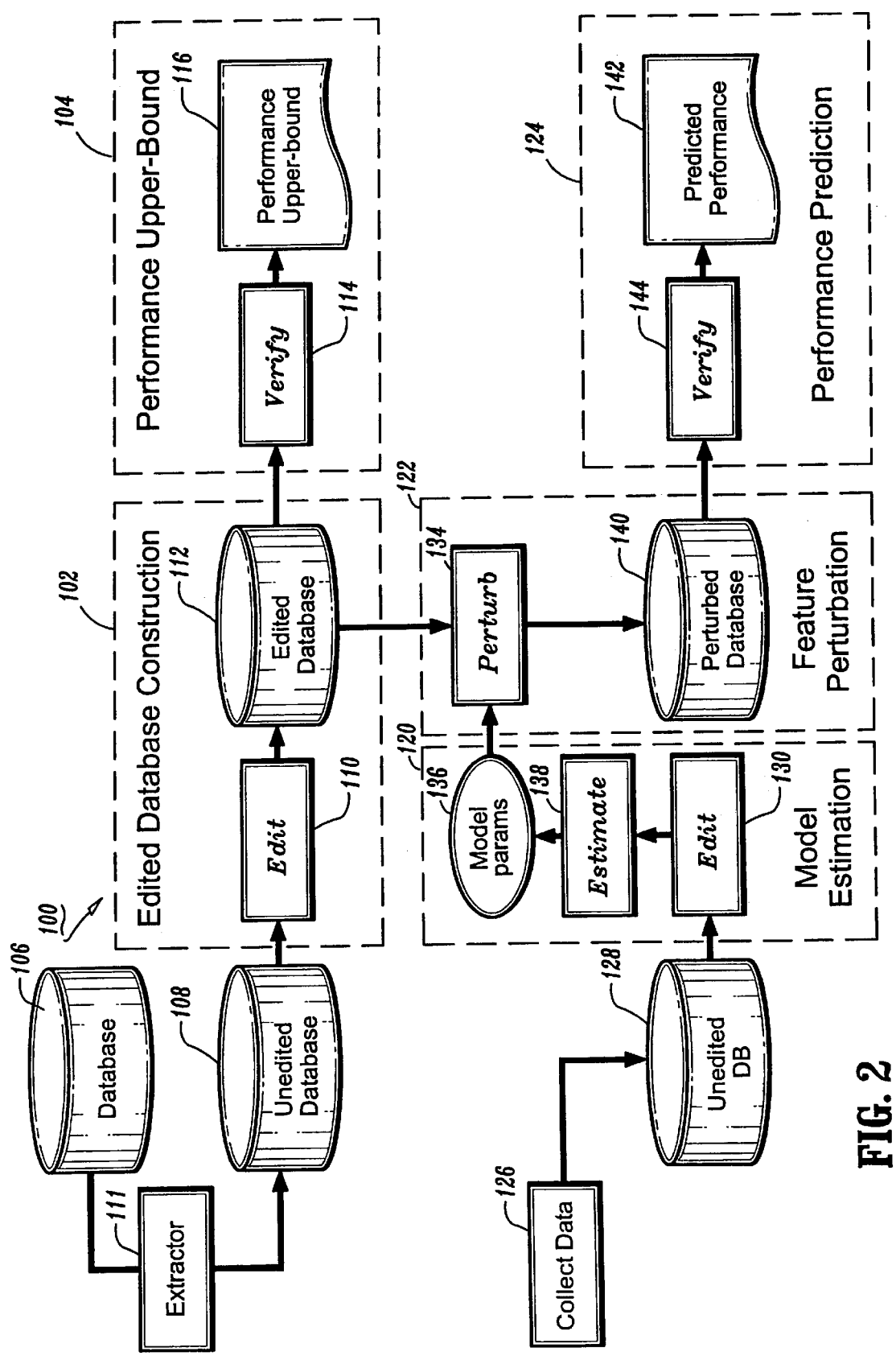
FIG. 2 is a block/flow diagram showing a system/method for evaluating a biometric detection system in accordance with the present invention.

It should be understood that the elements shown in FIG. 2 may be implemented in various forms of hardware, software or combinations thereof. Preferably, these elements are implemented on one or more appropriately programmed general purpose digital computers having a processor and memory and input/output interfaces. It should also be understood that although the present invention will be described in terms of fingerprint verification, the present invention is broader and is applicable to other technologies as well. For example, the present invention may be adapted for use with face recognition, retinal recognition or any other biometric recognition systems.

Figure 1:
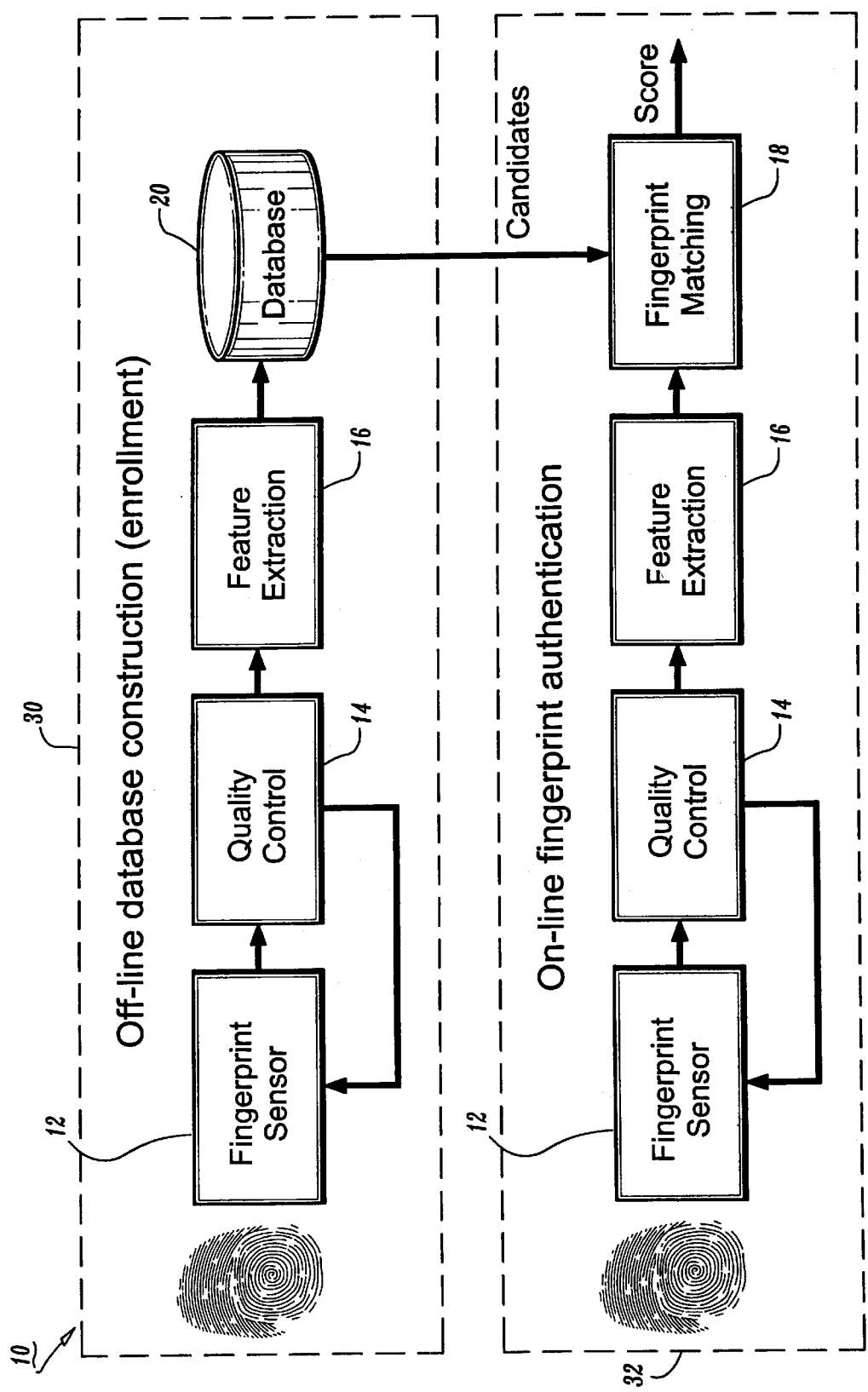
FIG. 1 is a block diagram showing a conventional fingerprint detection system, which may be evaluated in accordance with the present invention.

Referring now in specific detail to the drawings in which like reference numerals identify similar or identical elements throughout the several views, and initially to FIG. 2 (with continued reference to FIG. 1), a block/flow diagram of a system/method for evaluating biometric detection systems is illustratively shown. The present invention employs a new evaluation technology that is able to predict accurately the performance of any fingerprint system in large-scale trials without collecting a large number of fingerprints. This is achieved by the intelligent and effective use of data collected from small-scale trials and a large existing database. As explained above, FIG. 2 may be employed to evaluate any biometric recognition system or any other system, which employs a database of feature vectors or models.

An evaluation system 100 of the present invention includes an edited database construction module/block 102 and a performance upper-bound module/block 104. In block 102, a large database is built of edited features, e.g., minutia-features for fingerprint verification systems. In block 104, a feature matcher is evaluated independent of a sensor 12 and a feature extractor 16 (FIG. 1) of the system to be evaluated. A database 106 including a large number of mated fingerprints is selected to be edited by module 102. The selection may preferably include a database representative of a user population which the system to be evaluated is intended for. For a fingerprint system, one good candidate may be the widely used standard fingerprint image database, NIST-14, available from the National Institute of Statistics and Technology. NIST-14 has a large data base size and a balanced fingerprint pattern distribution.

A minutia-feature database (unedited) 108 is built from the fingerprint database 106 using a feature extractor 111. To minimize the subsequent editing effort, extractor 111 should be tuned to produce the best possible features from images in the database 106. This minutia-feature database 108 is then edited and verified in block 110 to correct any errors that may have been committed by extractor 111. Feature editing may include the correction of the location, type and orientation of minutiae, addition and missing minutiae, deletion of false minutiae, correction of ridge flow quality map, among others. The resulting edited minutia-feature database 112 is equivalent to what a perfect feature extractor would have produced, and database 112 serves as the basis for subsequent performance testing.

Given a specific matcher to evaluate, a best possible performance for the matcher 18 (FIG. 1) may be found by applying the matcher to the edited feature database 112 in block 114. A matcher that performs poorly here will certainly do worse in a system level test when extractor errors are factored in. Upper-bound performance information is output in block 116. Examples of mate prints with low match score and non-mate prints with high score also provide very valuable insights about the matcher.

Most tasks performed in modules 102 and 104 are one-time only and independent of any particular fingerprint system. However, model estimation block 120, feature perturbation block 122 and performance prediction block 124 are applicable to specific systems. Given a system to be evaluated, blocks 120, 122 and 124 evaluate the degradation characteristics of the system's sensor and feature extractor and estimate the overall system, as will be described below.

In block 126, some fingerprint data are collected from a small field trial. The data are used to characterize the transformation from physical fingerprints to minutia features; e.g., to assess the characteristics of the sensor 12 and the feature extractor 16 combined. The data is preferably representative of the intended user population for the system in terms of acquired image quality. A small feature database 128 is built from collected data using the feature extractor of the fingerprint system under evaluation (e.g., extractor 16). This minutia-feature database 128 is edited in block 130 to correct any extraction errors from database 128. The editing results include a difference between outcomes from the actual and ideal extractors. In other words, the extracted features can be viewed as a degraded or perturbed version of the ideal features.

In block 138, a statistical perturbation model 136 is built which describes the degradation characteristics of the extracted features. Model parameters are estimated in block 138 from the differences between features before and after editing in block 130. This perturbation model 136 summarizes the degradation introduced by the sensor 12 and feature extractor 16 (see e.g., FIG. 1).

In block 134, the perturbation model 136 is applied to the large database 112 of edited minutia-features, constructed in block 102, to produce a perturbed feature database 140 that is statistically similar to unobserved databases that could have been obtained from large-scale field trials. In block 144, the matcher 20 (se e.g., FIG. 1) of the system to be evaluated is applied to a resulting large database of perturbed features 140 to produce a realistic estimate of the actual performance of the system in large-scale trials, as output in block 142. The large database 140 is preferred to provide the rich variability and complexity inherent in fingerprints for a realistic system assessment.

To carry out the evaluation in accordance with the present invention, implementation of the following components is described in greater detail. The present invention includes a custom-built minutia editor of blocks 110 and 130, a large edited database of minutia features 112, a statistical model for feature perturbation 136, a method for estimation of the model parameters 138, and tools for reporting evaluation results, blocks 114 and 144.

Minutia editors 110 and 130 include a graphical minutia editor, which includes a full array of user-friendly features to facilitate interactive editing. Editing functions may include the correction of position, orientation and type of each minutia, adding missing m minutiae, deleting false minutiae, assessing image quality, association and correction of ridge confidence, among other features. Editors 110 and 130 provide better images for improving extraction and/or matching evaluation in accordance with the invention.

Large edited database of minutia features 112 is a database, which is constructed in advance. Constructing this database may be very time consuming depending on the amount of data available.

In one example, a database employed by the inventors includes 1009 entries from 267 distinct fingers. During its construction, prints from a same finger are compared side-by-side to verify the minutia correspondences to minimize editing errors. This database 112 provides for the performance evaluation, described in accordance with the present invention. Database 112 permits accurate statistical models to be built to study print warping, minutia distribution, strengths and weaknesses of a system in controlled settings, etc.

The statistical model for feature perturbation 136 accurately characterizes the degradation in extracted features as compared to a ground truth or reference resulting from, for example, the manually edited version. Many types of degradation are included in the model, for example, position and orientation shifts, minutia type mismatching, missing and false minutiae, and spatial warping. Position and angle shifts are characterized as Gaussian random variables, and type mismatch, missing and false minutiae are modeled as Bernoulli events. The model parameters are functions of the image quality; e.g., more perturbation is applied to bad images and less to good ones. In addition, the parameters are spatially varying and temporarily correlated. The spatially varying feature accounts for severe local perturbation and non-finger areas. The temporarily correlated feature incorporates the correlated perturbation occurred at the same location of a finger in prints taken at different times.

Method to estimate the model parameter 138 is included in the present invention. The first step for parameter estimation is to collect degradation statistics. For each fingerprint, a list of true, false and missing minutiae are listed, as well as the quality index of the prints. For each minutia in the list, the following are registered: the ridge confidence value, deviations of position and orientation, and possible type mismatch. In addition, the minutia correspondences between mate prints obtained from the matcher that are needed to estimate temporal correlation are recorded. Mate prints are finger prints acquired from the same finger of the same person. The model parameters are then estimated following, for example, a maximum likelihood principle from the compiled statistics.

Tools for reporting evaluation results include block 114 and 144. This component provides tools to automate a rather tedious process of generating evaluation reports in blocks 116 and 142. The perturbation model 138 is applied to the large edited feature database 112, the matcher 18 is applied to the perturbed database 140 to produce match scores, score distributions for mates and non-mates are calculated from the scores, and charts of score distributions, FAR-FRR (false acceptance rate-false rejection rate) curves, receiver operating curve (ROC) or other curves are produced and may even be imported directly to word processing and presentation software such as, for example, MS WORD and POWERPOINT.

Figure 3:
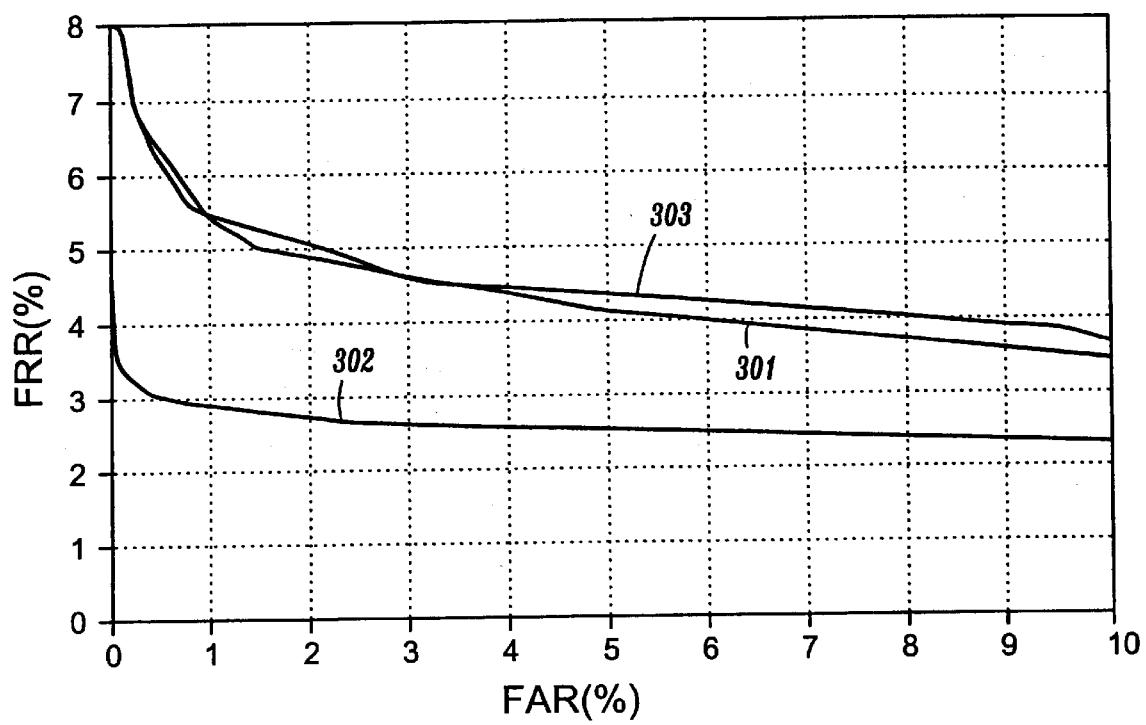
FIG. 3 is a plot of false rejection rate versus false acceptance rate for three databases in accordance with an illustrative example of the present invention.

To illustrate the effectiveness, the evaluation technology of the present invention has been applied to a fingerprint verification system developed by Siemens Corporation. A feature database of 1009 fingerprints from 267 fingers was manually edited, and a perturbation model was computed from a subset of 208 prints from 48 fingers, and the model was then applied to the edited database to produce a perturbed database. FIG. 3 shows the FAR-FRR curves obtained from three minutia-feature databases: unedited 301, edited 302 and perturbed 303. The edited database produces the best performance and serves as the reference for what the matcher could have achieved if the feature extractor were perfect. On the other hands, the FAR-FRR curves from the unedited and perturbed databases are similar.

Having described preferred embodiments for evaluation system and method for fingerprint verification (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for evaluating a biometric detection system, comprising the steps of:

providing an edited database including a plurality of biometric images with corrected extracted features;

editing a second database, smaller than the edited database, which includes biometric images employed to evaluate the biometric detection system, the second database having errors in extracted features corrected;

constructing a statistical perturbation model to describe degradation characteristics of the extracted features from the second database as provided in the editing step;

applying the statistical perturbation model to the edited database to construct a perturbed database sensitive to degradations of the biometric detection system; and evaluating the biometric detection system against the edited database and the perturbed database to predict a performance of the biometric detection system.

2. The method as recited in claim 1, wherein the biometric detection system includes a fingerprint recognition system.

3. The method as recited in claim 1, wherein the step of constructing a statistical perturbation model to describe degradation characteristics of the extracted features from the second database as provided in the editing step includes estimating a difference between an ideal feature extractor and a degraded feature extractor which provided the degradation characteristics.

4. The method as recited in claim 1, wherein the step of providing an edited database including a plurality of biometric images with corrected extracted features includes the steps of:

extracting biometric features from a database representative of a user population using a feature extractor; and correcting errors committed by the feature extractor.

5. The method as recited in claim 1, wherein the step of editing a second database includes the steps of:

extracting biometric features from a database representative of a user population using a feature extractor; and correcting errors committed by the feature extractor.

6. The method as recited in claim 1, wherein the step of constructing a statistical perturbation model includes the step of recording differences in the degradation characteristics of the extracted features from the second database before and after the step of editing to summarize degradation introduced by a sensor and a feature extractor of the biometric detection system.

7. A method for evaluating a biometric detection system, comprising the steps of:

providing a first database having a plurality of biometric images representative of a predetermined population;

editing the first database to construct an edited database, the edited database having errors in extracted features from the first database corrected;

providing a second database, smaller than the first database, which includes biometric images employed to evaluate the biometric detection system, the second database being representative of a sample of the predetermined population;

editing the second database to construct an edited database having errors in extracted features from the second database corrected;

constructing a statistical perturbation model to describe degradation characteristics of the extracted features from the second database;

applying the statistical perturbation model to the first database to construct a perturbed database sensitive to degradations of the biometric detection system; and evaluating the biometric detection system against the first database and the perturbed database to predict a performance of the biometric detection system.

8. The method as recited in claim 7, wherein the biometric system includes a fingerprint recognition system and the biometric images include images of fingerprints.

9. The method as recited in claim 7, wherein the step of constructing a statistical perturbation model to describe degradation characteristics of the extracted features from the second database includes estimating a difference between an ideal feature extractor and a degraded feature extractor which provided the degradation characteristics.

10. The method as recited in claim 7, wherein the step of editing the first database includes the steps of:

extracting biometric features from the first database using a feature extractor; and correcting errors committed by the feature extractor.

11. The method as recited in claim 7, wherein the step of editing the second database includes the steps of:

extracting biometric features from the second database using a feature extractor; and correcting errors committed by the feature extractor.

12. The method as recited in claim 7, wherein the step of constructing a statistical perturbation model includes the step of recording differences in the degradation characteristics of the extracted features from the second database before and after the step of editing the second database to summarize degradation introduced by a sensor and a feature extractor of the biometric detection system.

13. A program storage device readable by machine, tangibly embodying a program of instructions executable by the machine to perform method steps as recited in claim 7.

14. A program storage device readable by machine, tangibly embodying a program of instructions executable by the machine to perform method steps for evaluating a biometric detection system, the method steps comprising:

providing an edited database including a plurality of biometric images with corrected extracted features;

editing a second database, smaller than the edited database, which includes biometric images employed to evaluate the biometric detection system, the second database having errors in extracted features corrected;

constructing a statistical perturbation model to describe degradation characteristics of the extracted features from the second database as provided in the editing step;

applying the statistical perturbation model to the edited database to construct a perturbed database sensitive to degradations of the biometric system; and evaluating the biometric system against the edited database and the perturbed database to predict a performance of the biometric system.

15. The program storage device as recited in claim 14, wherein the biometric system includes a fingerprint recognition system.

16. The program storage device as recited in claim 14, wherein the step of constructing a statistical perturbation model to describe degradation characteristics of the extracted features from the second database as provided in the editing step includes estimating a difference between an ideal feature extractor and a degraded feature extractor which provided the degradation characteristics.

17. The program storage device as recited in claim 14, wherein the step of providing an edited database including a plurality of biometric images with corrected extracted features includes the steps of:

extracting biometric features from a database representative of a user population using a feature extractor; and correcting errors committed by the feature extractor.

18. The program storage device as recited in claim 14, wherein the step of editing a second database includes the steps of:

extracting biometric features from a database representative of a user population using a feature extractor; and correcting errors committed by the feature extractor.

19. The program storage device as recited in claim 14, wherein the step of constructing a statistical perturbation model includes the step of recording differences in the degradation characteristics of the extracted features from the second database before and after the step of editing to summarize degradation introduced by a sensor and a feature extractor of the biometric detection system.

* * * * *